Oct. 26, 1937.  E. O. SCHJOLIN  2,096,979
CONE CLUTCH
Filed Dec. 21, 1935   2 Sheets-Sheet 2

Inventor
Eric Olle Schjolin
By Blackmore, Spencer & Flint
Attorneys

Patented Oct. 26, 1937

2,096,979

UNITED STATES PATENT OFFICE 2,096,979

CONE CLUTCH

Eric Olle Schjolin, Pontiac, Mich., assignor to General Motors Corporation, Detroit, Mich., a corporation of Delaware Application December 21, 1935, Serial No. 55,626

5 Claims. (Cl. 192—66)

This invention relates to clutches for use on automotive vehicles. The clutch is particularly adapted to vehicles having the engine mounted at the rear and in which the transmission is positioned transversely of the vehicle or parallel with the rear axle.

The clutch is of the cone type and the improvement consists in refinements in the construction of the clutch whereby the driving and driven members may be easily made and at less expense than clutches known in the art.

The objects of the invention are accomplished by forming the driving member of two sheets of thin metal which are welded together and after they are welded they are shaped to form the clutch member. A steel hub is secured at the middle and is splined to the shaft driven by the engine. The driven member is also formed of two thin plates welded together and suitably shaped, but instead of being formed into conical shape at its periphery the driven member is provided with a steel ring forming on its inside the driven clutching face and having on its outer side teeth which are adapted to be engaged by the starting motor of the vehicle. The driven member has a third plate or disc secured thereto which is suitably shaped so that with the back of the web of the driven member the third plate will form a groove for the belt which drives the water pump. A steel hub forms the center of the driven member. Preferably the driven member is provided with a series of pressed out buttons which are machined, the purpose of which is accurately to position the steel ring.

On the drawings

Figure 1:
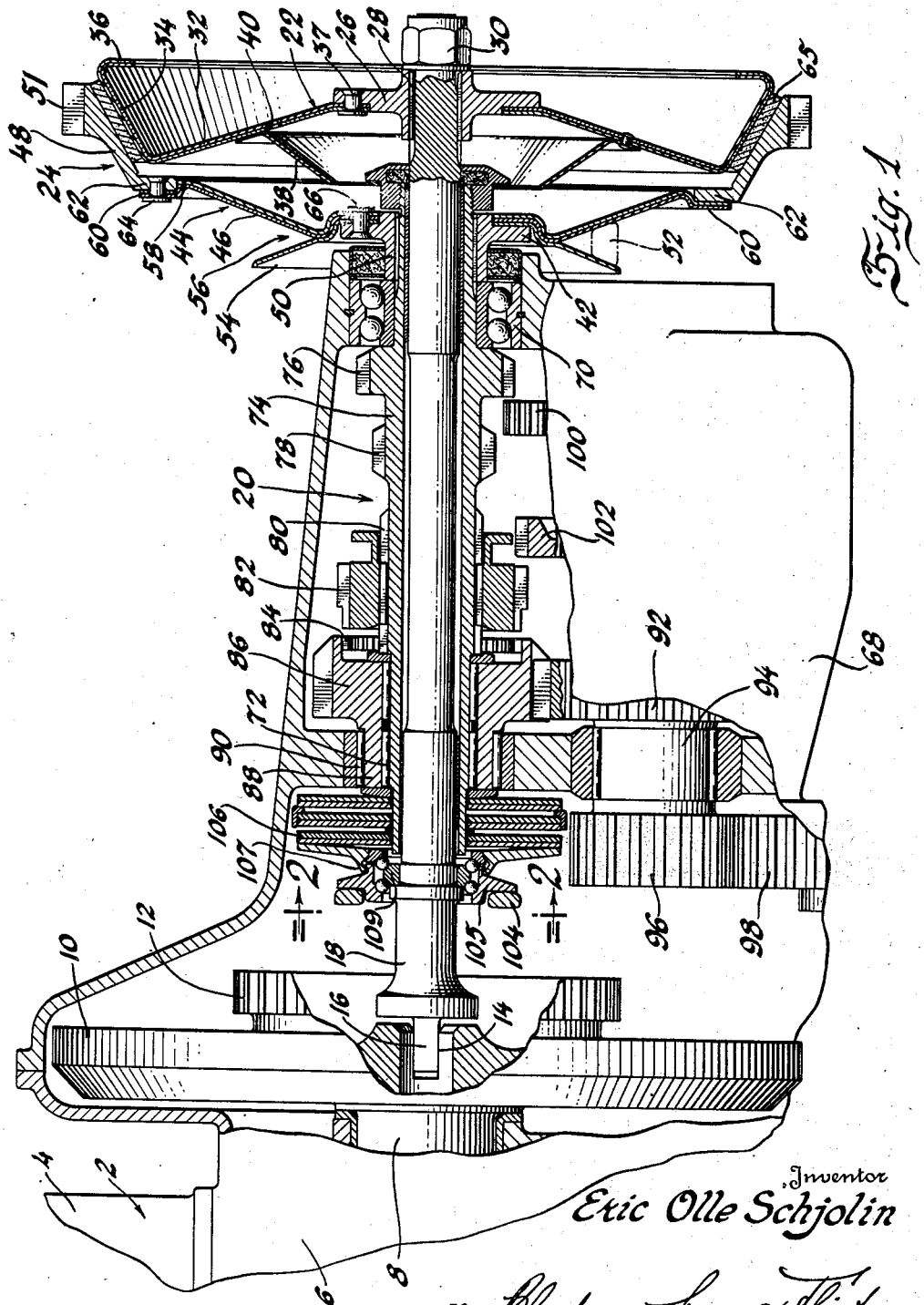
Figure 1 is a view in section through the clutch of the invention and its interrelated transmission.
Figure 2:
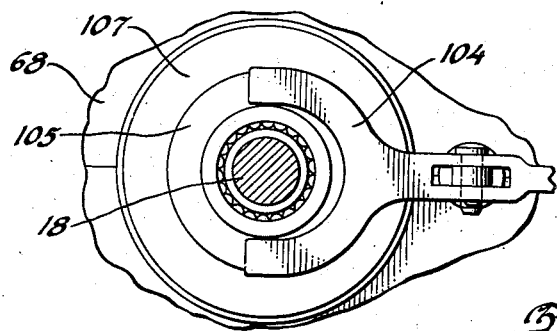
Figure 2 is a view of the clutch shifting fork and related construction taken on the line 2—2 of Figure 1.
Figure 3:
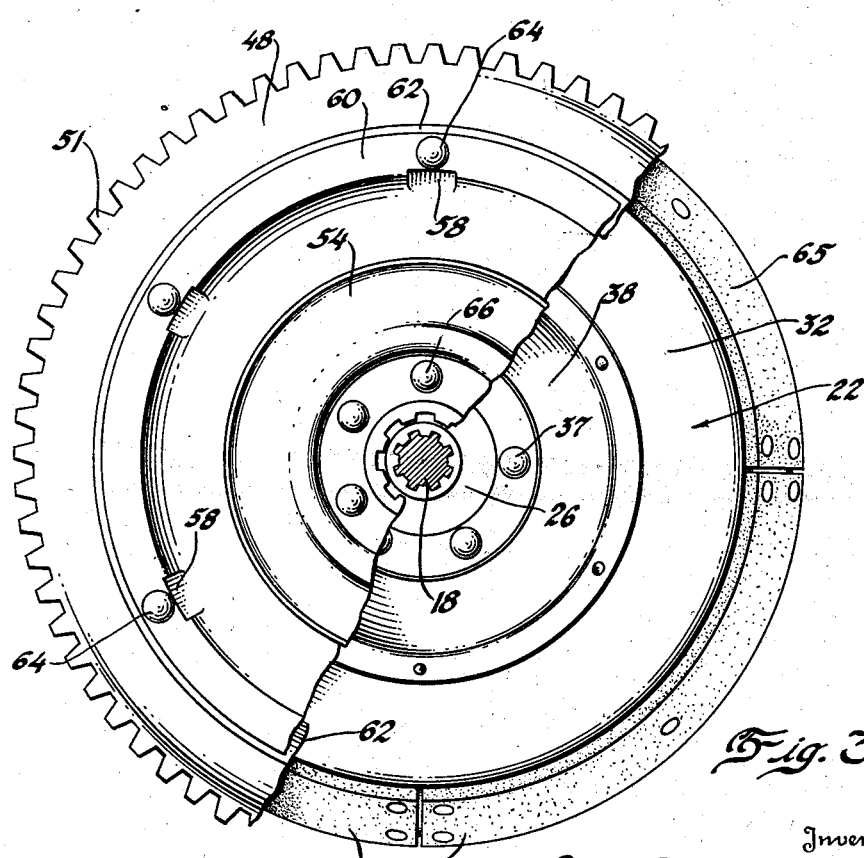
Figure 3 is an end view of the driven member of the cone clutch with parts broken away and shown in section better to illustrate the invention.

Referring to the drawings, the numeral 2 indicates an internal combustion engine of any suitable type. The engine has the usual cylinders 4 and crankcase 6 in which the crankshaft 8 is journaled. The crankshaft has the flywheel 10, and formed integral therewith is the gear 12 which is used to drive any suitable part; in the present instance it is used to drive a blower. The flywheel is provided with a slot 14 in which there is slidably received the tongue 16 on the end of the shiftable shaft 18 which passes through the transmission 20 and has secured at its outer end the driving member 22 of the cone clutch of the invention indicated as a whole at 24. The driving member 22 is provided with the steel hub 26 splined to the shaft as indicated at 28 and held thereon by nut 30 threaded on the end of the shaft. The driving member 22, in addition to the steel hub 26, is comprised of the web 32, the inclined clutch engaging face 34 and the reinforcing flange 36. Rivets 37 secure the hub 26 and web 32 together. Additionally, an oil slinger 38 is secured to the interior of the web 32, the web being provided with the openings 40 to allow an escape of grease or oil which may be caught by the slinger 38 as it drops from the end bearing 42 of the shaft 18.

The clutch member 22 is made by placing together two flat thin sheets of metal, about 3/64" thick, and then spot welding them together at a suitable and desired number of points. After it is spot welded the clutch member 22 is formed by a series of stamping or pressing operations into the shape shown in Figure 1. In its final form the two parts which make up the clutch member 22 closely interfit and are complemental throughout their extent.

The driven member of the clutch is designated as a whole at 44 and comprises the web 46 composed of two thin flat sheets of metal, about 3/64" thick, the outer steel ring 48 and the steel hub 50. The ring 48 has the peripheral teeth 51 to enable a starting motor (not shown) to rotate the clutch to start the engine 2. The web 46 is formed similarly to the driving member 22 in that two flat sheets of metal are first placed together and suitably spot welded. They are then shaped to the shape shown in Figure 1.

In order to form a pulley to drive the belt 52 for the water pump, an additional plate 54 is formed to the shape shown in Figure 1 and is suitably spot welded to the finished web 46 so as to form a V or groove 56 to receive the belt 52.

At the outer periphery or edge of the web 46 a series of buttons or indentations 58 is formed. These are formed merely by pressing inward or shearing a small part of the metal so that the shorn or pressed-in part will project inwardly beyond the outer flange 60 of the web. The edges of these pressed-in portions or buttons 58 are machined to form a smooth surface in order to enable the accurate positioning of the flange 62 of the ring 48. The flanges 60 and 62 are secured together by the rivets 64, preferably six rivets being used.

The usual brake lining is shown at 65.

The steel hub 50 and the inner edges of the web 46 and the plate 54 are secured together by the means of the rivets 66.

Inasmuch as the driving and driven members of the cone clutch 24 are reversed from their usual position, it is believed advisable to show a portion of the transmission in connection therewith and the manner in which the clutch is operated.

The transmission case is indicated at 68 and is provided with the end bearings 70 and 72 in which there is turnably mounted the shaft 74, the shaft 74 in turn forming the bearings for the driving shaft 18 of the motor. Integrally formed with the shaft 74 is the low or first speed gear 76 and the reverse gear 78. The shaft has the splined portion 80 on which there is slidably mounted the gear 82 adapted to mesh with the internal teeth 84 of gear 86 having a hub 88 adapted to turn in the bearings 72 and 90. By shifting the gear 82 into engagement with the internal teeth 84 the direct drive of the vehicle is accomplished by driving the gear 92 on the shaft 94 parallel to the shaft 74. The shaft 94 has the gear 96 on its end which meshes with an idler 98 which is connected to the usual ring gear of the differential (not shown). To drive in first speed the gear 100 is shifted to the right to mesh with the gear 76 and for reverse the gear 100 is shifted to the left to mesh with the idler (not shown) which in turn is driven from the gear 78. Second speed is accomplished by shifting the gear 82 to the right to mesh with gear 102.

The driving member 22 of the clutch 24 is also the shiftable member and in this instance the clutch member 22 is shifted by sliding longitudinally the driving shaft 18. This is accomplished by the fork 104 which operates on the plate 105 of a bearing member 107 to slide the shaft 18 to the right (Figure 1) against the tension of the three Belleville washers 106. The ring 109 of the bearing 107 is rigid with the shaft 18. When the clutch fork 104 is released, the Belleville washers 106 will pull the shaft 18 and the clutch member 22 to the left to cause the inclined surfaces of the cone clutch to engage to cause the driven member 44 to drive the shaft 74 of the transmission.

One advantage resulting from the construction is that there is considerable resiliency in both the driving and the driven members. This resiliency is the result of making the clutch members of two thin sheets.

Owing to the structural interrelation of the parts as described, it is to be noted that in order to start the engine 2 the driving member 22 of the clutch member must be in engagement with the driven member 44. When they are disengaged the starting motor will spin or rotate the driven member 44 and the transmission 20 but without turning over the engine. This independent rotation of the driven member and the transmission is of considerable service in the starting of the motor for the reason that the starting motor will readily spin or rotate these parts when the clutch members are disengaged. After they have been brought to their maximum speed of rotation with the clutch disengaged, the operator will suddenly release the clutch pedal to cause the driving member 22 to engage with the driven member 44 and the inertia of the movement of part 44 and the transmission 20 will communicate its movement to the shaft 18 and crankshaft 8 to cause the motor to start turning over. It is much easier to start the engine in this way than by leaving the clutch members in engagement. When the clutch members are left in engagement there is lost the inertia of movement of the driven clutch member 44 of the transmission. During cold weather when the oil is thick and the parts are more difficult to rotate because of the increased density of the oil, the starting motor will readily turn the driven member 44 and the transmission 20 when the clutch is disengaged, whereas were the clutch engaged, the motor must rotate all the parts which it can do with difficulty only because additional frictional resistance is added due to the fact that the starting motor must now turn over the engine as well, in order to get it started.

I claim:

1. In a cone clutch, a driving member comprising two thin interfitting pieces of metal welded together, each piece comprising a central disc part and a peripheral cone part, said pieces being complemental to each other throughout their extent.

2. In a cone clutch, a driving member comprising two thin interfitting pieces of metal secured together, each of said pieces comprising a metal web portion, an inclined surface forming the engaging clutch surface, and a strengthening flange on the edge of the inclined portion, said pieces interfitting and being complemental to each other throughout their extent.

3. In a cone clutch, a driving member comprising two thin interfitting pieces of metal secured together, each of said pieces comprising a metal web portion, an inclined surface forming the engaging clutch surface, a strengthening flange on the edge of the inclined portion, said pieces interfitting and being complemental to each other throughout their extent, and a hub secured to the web portion.

4. In a cone clutch, a driven member comprising a web portion comprising two thin pieces of metal secured together, a steel ring secured to the web portion and forming one member of the cone clutch, and a hub secured to the web.

5. In a cone clutch, a driven member comprising a web portion comprising two thin pieces of metal secured together, a steel ring secured to the web portion and forming one member of the cone clutch, a hub secured to the web, and teeth on the ring to enable the application of starting mechanism to the clutch.

ERIC OLLE SCHJOLIN.